United States Patent
Nishiguchi et al.

(10) Patent No.: US 10,676,087 B2
(45) Date of Patent: Jun. 9, 2020

(54) VEHICLE CONTROL SYSTEM AND VEHICLE CONTROL METHOD

(71) Applicant: HONDA MOTOR CO., LTD., Minato-ku, Tokyo (JP)

(72) Inventors: Haruhiko Nishiguchi, Wako (JP); Idhsada Sanguanwongthong, Wako (JP); Hiroyuki Koibuchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/059,123

(22) Filed: Aug. 9, 2018

(65) Prior Publication Data
US 2019/0047561 A1 Feb. 14, 2019

(30) Foreign Application Priority Data

Aug. 14, 2017 (JP) ................................. 2017-156432

(51) Int. Cl.
*G08G 1/01* (2006.01)
*B60W 30/12* (2020.01)
(Continued)

(52) U.S. Cl.
CPC ...... *B60W 30/12* (2013.01); *B60W 30/18163* (2013.01); *B60W 50/14* (2013.01);
(Continued)

(58) Field of Classification Search
CPC ........... B60W 30/12; B60W 30/18163; B60W 50/14; B60W 2550/10; B60W 2550/308;
(Continued)

(56) References Cited

U.S. PATENT DOCUMENTS

2016/0339913 A1* 11/2016 Yamashita .......... B60W 30/146
2018/0162396 A1*  6/2018 Ibuka ............... G08G 1/096725
(Continued)

FOREIGN PATENT DOCUMENTS

JP   2012-226392   11/2012
JP   2017-033060    2/2017
(Continued)

OTHER PUBLICATIONS

Japanese Office Action for Japanese Patent Application No. 2017-156432 dated Apr. 16, 2019.

*Primary Examiner* — Dalena Tran
(74) *Attorney, Agent, or Firm* — Amin, Turocy & Watson, LLP

(57) ABSTRACT

A vehicle control system includes a lane change intention detector that detects an intention of a lane change by an occupant of a vehicle, a recognizer that recognizes a surrounding situation of the vehicle, and a lane change controller that determines whether the lane change by the vehicle is possible based on the surrounding situation recognized by the recognizer, and changes a lane of the vehicle to another lane, independently of a steering operation of the occupant of the vehicle, based on a detection result of the lane change intention detector and the determined result, wherein the lane change controller decides a starting timing of the lane change based on whether a predetermined time has passed or the vehicle has traveled a predetermined distance after the intention of the lane change is detected by the lane change intention detector.

9 Claims, 10 Drawing Sheets

```
PLEASE WAIT FOR SOME TIME UNTIL
     LANE CHANGE IS STARTED
          (DURING WAITING)
```

(51) Int. Cl.
  *B60W 30/18* (2012.01)
  *B60W 50/14* (2020.01)
  *G08G 1/16* (2006.01)
(52) U.S. Cl.
  CPC ......... *G08G 1/167* (2013.01); *B60W 2420/42* (2013.01); *B60W 2520/06* (2013.01); *B60W 2540/20* (2013.01); *B60W 2554/00* (2020.02); *B60W 2554/801* (2020.02)
(58) Field of Classification Search
  CPC ......... B60W 2520/06; B60W 2540/20; B60W 2420/42; G08G 1/167; B60T 2201/08; B60T 2201/022
  USPC ................................ 701/41, 1, 301; 340/436
  See application file for complete search history.

(56) References Cited

U.S. PATENT DOCUMENTS

2018/0297611 A1* 10/2018 Fujisawa ................ B60W 50/14
2018/0354517 A1* 12/2018 Banno ................... B60W 50/14

FOREIGN PATENT DOCUMENTS

| JP | 2017-074918 | 4/2017 |
| JP | 2017-097495 | 6/2017 |
| JP | 2017-102519 | 6/2017 |

\* cited by examiner

VEHICLE CONTROL SYSTEM AND VEHICLE CONTROL METHOD

CROSS-REFERENCE TO RELATED APPLICATIONS

This application is based upon and claims the benefit of priority from Japanese Patent Application No. 2017-156432, filed Aug. 14, 2017; the entire contents all of which are incorporated herein by reference.

BACKGROUND OF THE INVENTION

Field of the Invention

The present invention relates to a vehicle control system and a vehicle control method.

Description of Related Art

In the related art, a technology for suppressing a lane change when there is a vehicle that is an obstacle to the lane change on a target lane, waiting until the vehicle that is an obstacle is gone, releasing the suppression of the lane change, and then performing the lane change is known (for example, see Japanese Unexamined Patent Application, First Publication No. 2012-226392).

SUMMARY OF THE INVENTION

However, in the related art, there are cases where after a direction indicator is operated, when there is no vehicle that is an obstacle to the lane change, the lane change is directly performed, and there are cases where consideration of nearby vehicles or an occupant of a subject vehicle is not sufficient.

Aspects of the present invention are achieved in view of the problems described above, and one of the objects is to provide a vehicle control system and a vehicle control method, by which it is possible to perform a lane change in consideration of a nearby vehicle or an occupant.

A vehicle control system and a vehicle control method according to the present invention employ the following configurations.

(1) An aspect of the present invention is a vehicle control system including a lane change intention detector that detects an intention of a lane change by an occupant of a vehicle, a recognizer that recognizes a surrounding situation of the vehicle, and a lane change controller that determines whether the lane change by the vehicle is possible based on the surrounding situation recognized by the recognizer, and changes a lane of the vehicle to another lane, independently of a steering operation of the occupant of the vehicle, based on the detection result of the lane change intention detector and the determined result, wherein the lane change controller decides a starting timing of the lane change based on whether a predetermined time has passed or the vehicle has traveled a predetermined distance after the intention of the lane change is detected by the lane change intention detector.

(2) In the vehicle control system of the aspect (1), before the predetermined time passes after the intention of the lane change is detected by the lane change intention detector, when it is determined that the lane change by the vehicle is possible, the lane change controller starts the lane change after the predetermined time passes, or before the vehicle travels the predetermined distance after the intention of the lane change is detected by the lane change intention detector, when it is determined that the lane change by the vehicle is possible, the lane change controller starts the lane change after the vehicle travels the predetermined distance.

(3) In the vehicle control system of the aspect (1) or (2), after the intention of the lane change is detected by the lane change intention detector and the predetermined time passes, when it is determined that the lane change by the vehicle is possible, the lane change controller starts the lane change after it is determined that the lane change is possible, or after the intention of the lane change is detected by the lane change intention detector and the vehicle travels the predetermined distance, when it is determined that the lane change by the vehicle is possible, the lane change controller starts the lane change after it is determined that the lane change is possible.

(4) In the vehicle control system of any one of the aspects (1) to (3), the vehicle control system further includes an information outputter (output unit) that outputs information, and an output controller that causes the information outputter to output information, wherein the output controller causes the information outputter to output standby information indicating that waiting without performing the lane change is performed before the lane change is started by the lane change controller after the intention of the lane change is detected by the lane change intention detector.

(5) In the vehicle control system of the aspect (4), the information outputter includes a display device, and the output controller causes the display device to display, as the standby information, one or more section lines, which partition a lane indicated by the intention detected by the lane change intention detector, among one or more section lines of a road recognized by the recognizer as the surrounding situation.

(6) In the vehicle control system of the aspect (5), the output controller changes a display mode when the section lines are displayed in a case where it is determined by the lane change controller that the lane change by the vehicle is possible and in a case where it is determined by the lane change controller that the lane change by the vehicle is not possible.

(7) In the vehicle control system of any one of the aspects (1) to (6), until a reference time longer than the predetermined time passes after the intention of the lane change is detected by the lane change intention detector, when it is not determined that the lane change by the vehicle is possible, the lane change controller stops the lane change, or until the vehicle travels a reference distance longer than the predetermined distance after the intention of the lane change is detected by the lane change intention detector, when it is not determined that the lane change by the vehicle is possible, the lane change controller stops the lane change.

(8) In the vehicle control system of the aspect (7), the vehicle control system further includes an information outputter that outputs information, and an output controller that causes the information outputter to output information, wherein the output controller causes the information outputter to output standby information indicating that waiting without performing the lane change is performed before the lane change is started by the lane change controller after the intention of the lane change is detected by the lane change intention detector, and when the lane change is stopped by the lane change controller, the output controller causes the information outputter to stop output of the standby information and causes the information outputter to output stop information indicating that the lane change is stopped.

(9) Another aspect of the present invention is a vehicle control method causing an in-vehicle computer to perform:

detecting an intention of a lane change by an occupant of a vehicle; recognizing a surrounding situation of the vehicle; determining whether the lane change by the vehicle is possible based on the recognized surrounding situation; changing a lane of the vehicle to another lane, independently of a steering operation of the occupant of the vehicle, based on the detection result of the intention of the lane change and the determined result; and deciding a starting timing of the lane change based on whether a predetermined time has passed or the vehicle has traveled a predetermined distance after the intention of the lane change is detected.

According to the aspects of (1) and (9), it is possible to perform the lane change in consideration of a nearby vehicle or an occupant.

According to the aspect of (2), when it is determined that the lane change is possible before the predetermined time passes (the vehicle travels the predetermined distance), since the lane change is performed after the predetermined time passes (the vehicle travels the predetermined distance), it is possible to prevent the lane change from being immediately started at a time point at which the lane change has become possible, and to let a nearby vehicle or an occupant know that a subject vehicle will then perform the lane change.

According to the aspect of (3), when it is determined that the lane change is possible after the predetermined time passes (the vehicle travels the predetermined distance), since the lane change is performed after the determination, it is possible to sufficiently let a nearby vehicle or an occupant know about the execution of the lane change and then to perform the lane change.

According to the aspects of (4) to (6), an occupant can recognize the reason that the lane change is not started, despite detection of a lane change intention.

According to the aspect of (7), when a waiting time of the lane change becomes long, that is, when there is great separation between a timing at which an occupant has operated the winker (indicator) for a lane change instruction and an actual start timing of the lane change, it is possible to stop the awaited lane change.

According to the aspect of (8), when a waiting time of the lane change becomes long, it is possible to notify an occupant that the instructed lane change has been stopped.

DETAILED DESCRIPTION OF THE INVENTION

Hereinafter, an embodiment of a vehicle control system and a vehicle control method of the present invention will be described with reference to the drawings.

[Overall Configuration]

Figure 1:
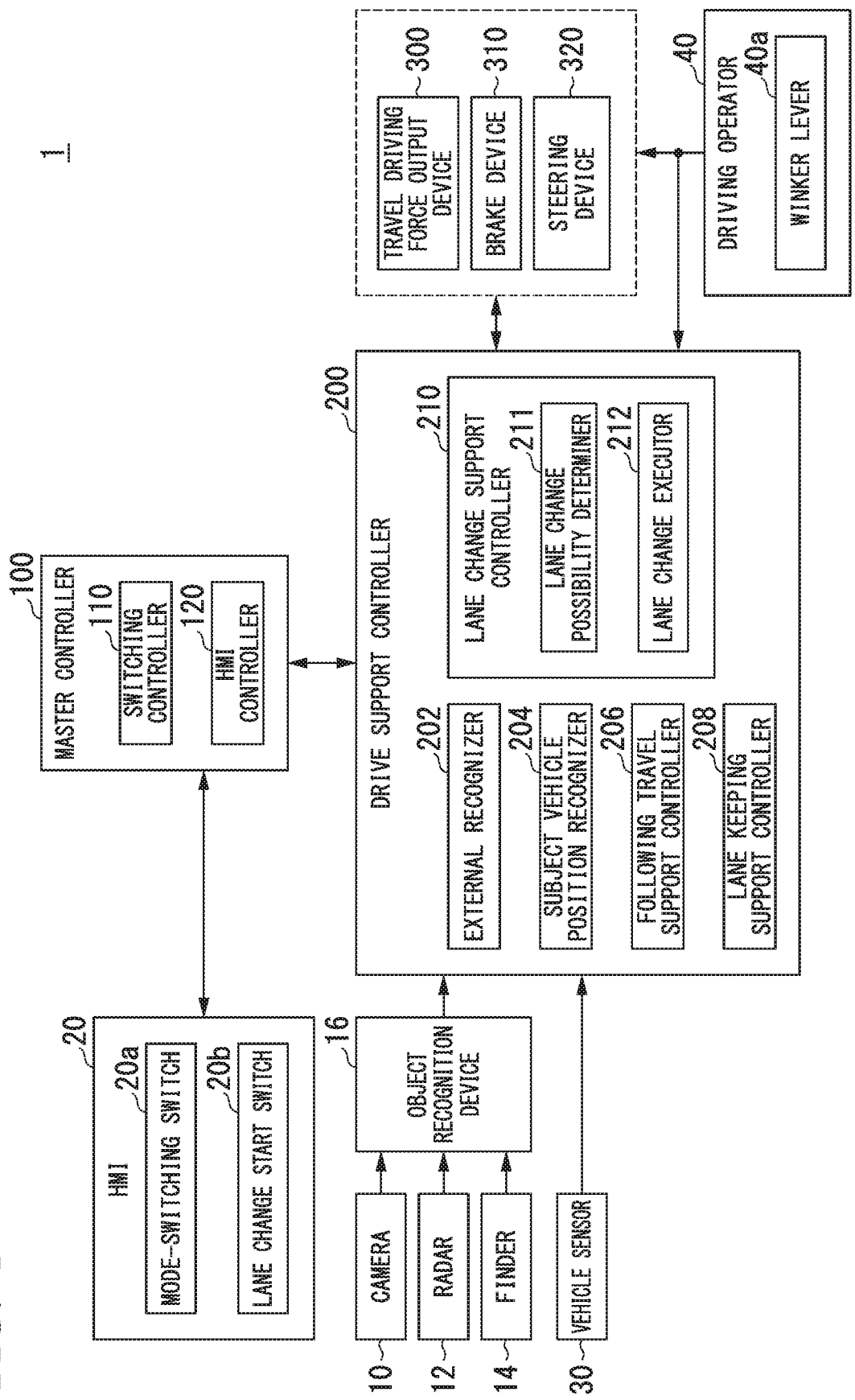
FIG. 1 is a configuration diagram of a vehicle control system of an embodiment.

FIG. 1 is a configuration diagram of a vehicle control system 1 of an embodiment. A vehicle (hereinafter, referred to as a "subject vehicle M"), in which the vehicle system 1 is installed, for example, is a vehicle with two wheels, three wheels, four wheels and the like, and its driving source is an internal combustion engine such as a diesel engine and a gasoline engine, an electric motor, or a combination thereof. The electric motor operates by using power generated by a generator connected to the internal combustion engine or power discharged from a secondary cell or a fuel cell.

The vehicle control system 1, for example, includes a camera 10, a radar 12, a finder 14, an object recognition device 16, a human machine interface (HMI) 20, a vehicle sensor 30, a driving operator 40, a master controller 100, a drive support controller 200, a travel driving force output device 300, a brake device 310, and a steering device 320. These devices and equipments are connected to one another via a multiplex communication line such as a controller area network (CAN) communication line, a serial communication line, a wireless communication network and the like. The configuration illustrated in FIG. 1 is merely an example, and parts of the configuration may be omitted, or other configurations may be added.

The camera 10, for example, is a digital camera using a solid-state imaging element such as a charge coupled device (CCD) and a complementary metal oxide semiconductor (CMOS). One or a plurality of cameras 10 are mounted at arbitrary places of the subject vehicle M. In the case of capturing an image of an area in front of the subject vehicle M, the camera 10 is mounted at an upper part of a front windshield, on a rear surface of a rear-view mirror, and the like. The camera 10, for example, periodically and repeatedly captures an image of an area in the vicinity of the subject vehicle M. The camera 10 may be a stereo camera.

The radar 12 emits radio waves such as millimeter waves to the vicinity of the subject vehicle M, detects radio waves (reflected waves) reflected by an object, and detects at least a position (a distance and an orientation) of the object. One or a plurality of radars 12 are mounted at arbitrary places of the subject vehicle M. The radar 12 may detect the position and the speed of the object by a frequency modulated continuous wave (FM-CW) scheme.

The finder 14 is a light detection and ranging or laser imaging detection and ranging (LIDAR) that measures scattered light for irradiation light and detects a distance to a target. One or a plurality of finders 14 are mounted at arbitrary places of the subject vehicle M.

The object recognition device 16 performs a sensor fusion process for detection results by some or all of the camera 10, the radar 12, and the finder 14, thereby recognizing the position, the type, the speed, the movement direction and the like of the object. The recognized object, for example, is an object such as a vehicle, a guardrail, an electric pole, a pedestrian, and a road sign. The object recognition device 16 outputs a recognition result to the drive support controller 200. The object recognition device 16 may output a part of information input from the camera 10, the radar 12, or the finder 14 to the drive support controller 200 as is.

The HMI 20 presents various types of information to an occupant (driver) of the subject vehicle M and receives an input operation by the occupant. The HMI 20, for example, includes various display devices such as a liquid crystal display (LCD) and an organic electroluminescence (EL) display, various buttons such as a mode-switching switch 20a and a lane change start switch 20b, a speaker, a buzzer, a touch panel and the like. Each piece of equipment of the HMI 20, for example, is mounted at an arbitrary place among an instrument panel, a passenger's seat, and a back seat.

The mode-switching switch 20a, for example, is a switch for switching between a drive support mode and a manual drive mode. The drive support mode, for example, is a mode in which one or both of the travel driving force output device 300/the brake device 310 and the steering device 320 are controlled by the drive support controller 200. The manual drive mode is a mode in which the travel driving force output device 300, the brake device 310, and the steering device 320 are controlled according to an operation amount of the driving operator 40.

The lane change start switch 20b is a switch for starting steering support control for changing a lane of the subject vehicle M, independently of an operation of a steering wheel by an occupant, in the drive support mode. The lane change start switch 20b is an example of a "lane change intention detector".

The vehicle sensor 30, for example, includes a vehicle speed sensor that detects a vehicle speed of the subject vehicle M, an acceleration sensor that detects an acceleration, a yaw rate sensor that detects an angular velocity around a vertical axis, a direction sensor that detects a direction of the subject vehicle M, and the like. Each sensor included in the vehicle sensor 30 outputs a detection signal indicating a detection result to the drive support controller 200.

The driving operator 40, for example, includes various operators such as the aforementioned steering wheel, a winker lever 40a (a direction indication switch) for operating a winker (a direction indicator), an accelerator pedal, a brake pedal, and a shift lever. In each operator of the driving operator 40, for example, an operation detector that detects an operation amount of an operation by an occupant is mounted. The operation detector detects a position of the winker lever 40a, a stepping amount of the acceleration pedal or the brake pedal, a position of the shift lever, a steering angle and steering torque of the steering wheel, and the like. The operation detector outputs a detection signal indicating a detection result to one or both of the drive support controller 200 and a combination of the travel driving force output device 300, the brake device 310, and the steering device 320. The winker lever 40a is another example of a "lane change intention detector".

[Configuration of Master Controller]

The master controller 100, for example, includes a switching controller 110 and an HMI controller 120. Some or all of these elements are implemented when a processor such as a central processing unit (CPU) and a graphics processing unit (GPU) executes a program (software). Furthermore, some or all of these elements may be implemented by hardware (a circuit unit: including circuitry) such as a large scale integration (LSI), an application specific integrated circuit (ASIC), and a field-programmable gate array (FPGA), or may be implemented by software and hardware in cooperation.

The switching controller 110 switches the drive mode of the subject vehicle M between the manual drive mode and the drive support mode on the basis of a detection signal output when the mode-switching switch 20a or the lane change start switch 20b of the HMI 20 is operated.

When the drive mode of the subject vehicle M is the manual drive mode, a detection signal (a detection signal indicating the degree of the operation amount of each operator) of the driving operator 40 is input to the travel driving force output device 300, the brake device 310, and the steering device 320. In this case, the input signal input from the driving operator 40 may be indirectly output to the travel driving force output device 300, the brake device 310, and the steering device 320 via the drive support controller 200.

Furthermore, when the drive mode of the subject vehicle M is the drive support mode, a control signal (a signal indicating a control amount of each device) is input from the drive support controller 200 to the travel driving force output device 300, the brake device 310, and the steering device 320.

For example, when the drive mode of the subject vehicle M is switched by the switching controller 110, the HMI controller 120 causes information on the mode switching to be output to each display, the speaker, and the like of the HMI 20. The HMI 20 is an example of an "information outputter" and the HMI controller 120 is an example of an "output controller".

Before description of the drive support controller 200, the travel driving force output device 300, the brake device 310, and the steering device 320 will be described. The travel driving force output device 300 outputs travel driving force (torque) for traveling the subject vehicle M to driving wheels. The travel driving force output device 300, for example, includes a combination of an internal combustion engine, an electric motor, a transmission and the like, and a power electric control unit (ECU) for controlling them. The power ECU controls the aforementioned elements according to information input from the drive support controller 200 or information input from the driving operator 40.

The brake device 310, for example, includes a brake caliper, a cylinder for transferring oil pressure to the brake caliper, an electric motor for generating the oil pressure in the cylinder, and a brake ECU. The brake ECU controls the electric motor according to the information input from the drive support controller 200 or the information input from the driving operator 40, thereby allowing brake torque in accordance with a brake operation to be output to each wheel. The brake device 310 may have a backup mechanism for transmitting oil pressure generated by an operation of the brake pedal included in the driving operator 40 to the cylinder via a master cylinder.

In addition to the aforementioned configuration, the brake device 310 may be an electronic control oil pressure brake device that controls an actuator according to the information input from the drive support controller 200, thereby transmitting oil pressure of the master cylinder to the cylinder.

The steering device 320, for example, includes a steering ECU and an electric motor.
The electric motor, for example, changes a direction of a turning wheel by allowing force to act on a rack and pinion mechanism. The steering ECU drives the electric motor according to the information input from the drive support controller 200 or the information input from the driving operator 40, thereby changing the direction of the turning wheel.

[Configuration of Drive Support Controller]

The drive support controller 200, for example, includes an external recognizer 202, a subject vehicle position recognizer 204, a following travel support controller 206, a lane keeping support controller 208, and a lane change support controller 210. The external recognizer 202 or the subject vehicle position recognizer 204 is an example of a "recognizer". The lane change support controller 210 is an example of a "lane change controller".

Some or all of the elements of the drive support controller 200 are implemented when a processor such as a CPU and a GPU executes a program (software).

Furthermore, some or all of the elements of the drive support controller 200 may be implemented by hardware such as an LSI, an ASIC, and an FPGA, or may be implemented by software and hardware in cooperation.

The external recognizer 202 recognizes states (positions, speeds, accelerations and the like) of nearby vehicles on the basis of information input from the camera 10, the radar 12, and the finder 14 via the object recognition device 16. The position of the nearby vehicle may be represented by a representative point of a centroid, a corner and the like of the nearby vehicle, or may be represented by an area expressed with an outline of the nearby vehicle. The "state" of the nearby vehicle may include an acceleration, a jerk, or a "behavior state" (for example, whether a lane change is performed or is intended to be performed) of the nearby vehicle. Furthermore, the external recognizer 202 may recognize a state of another type of an object, such as a guardrail, an electric pole, a parked vehicle, and a pedestrian, in addition to the nearby vehicle.

The subject vehicle position recognizer 204, for example, recognizes a lane (a travel lane) in which the subject vehicle M is traveling, and a relative position and orientation of the subject vehicle M with respect to the travel lane. The subject vehicle position recognizer 204, for example, recognizes road section lines LM from an image captured by the camera 10 and recognizes, as the travel lane, a lane partitioned by two section lines LM nearest the subject vehicle M among the recognized section lines LM. Then, the subject vehicle position recognizer 204 recognizes a position and an orientation of the subject vehicle M with respect to the recognized travel lane.

Figure 2:
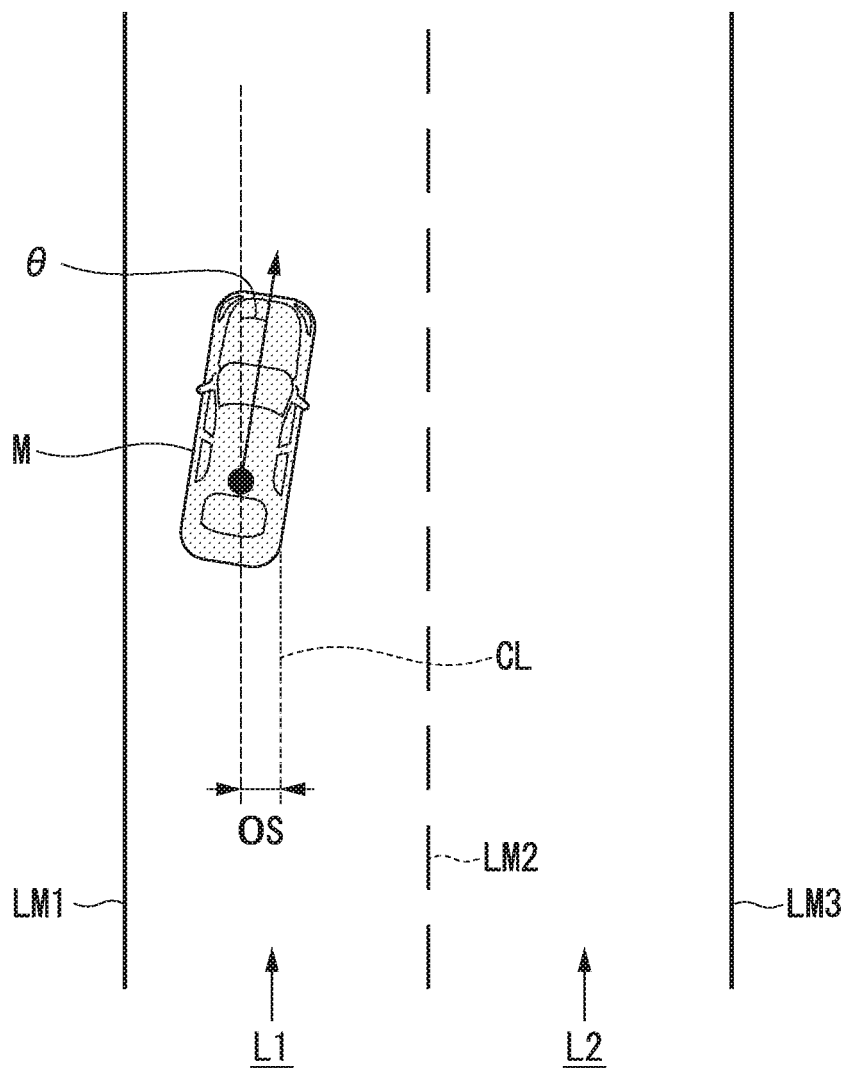
FIG. 2 is a diagram illustrating a mode in which a relative position and an orientation of a subject vehicle M for a travel lane are recognized by a subject vehicle position recognizer.

FIG. 2 is a diagram illustrating a mode in which a relative position and an orientation of the subject vehicle M for a travel lane L1 are recognized by the subject vehicle position recognizer 204. The subject vehicle position recognizer 204, for example, recognizes section lines LM1 to LM3, and recognizes an area between the section lines LM1 and LM2 nearest the subject vehicle M as the travel lane L1 of the subject vehicle M. Then, the subject vehicle position recognizer 204 recognizes, as the relative position and the orientation of the subject vehicle M with respect to the travel lane L1, separation OS from a travel lane center CL of a reference point (for example, a centroid) of the subject vehicle M and an angle θ formed between a line connecting the travel lane center CL and the travel direction of the subject vehicle M. Instead of this, the subject vehicle position recognizer 204 may recognize the position and the like of the reference point of the subject vehicle M with respect to any side end portions of the host lane L1 as the relative position of the subject vehicle M with respect to the travel lane.

Furthermore, the subject vehicle position recognizer 204, for example, may recognize an adjacent lane adjacent to the host lane.

For example, the subject vehicle position recognizer 204 recognizes an area between a section line near the subject vehicle M next to the section line of the host lane and the section line of the host lane as the adjacent lane. In the example of FIG. 2, for example, the subject vehicle position recognizer 204 recognizes an area between the section line LM2 of the host lane and the section line LM3 near the subject vehicle M next to the section line LM2 as a right adjacent lane L2.

The following travel support controller 206, for example, controls the travel driving force output device 300 and the brake device 310 such that the subject vehicle M follows a nearby vehicle (hereinafter, referred to as a front traveling vehicle) existing in a predetermined distance (for example, about 50 m) in front of the subject vehicle M among the nearby vehicles recognized by the external recognizer 202, thereby accelerating or decelerating the subject vehicle M in a range of a setting vehicle speed (for example, 50 km/h to 100 km/h) decided in advance. The "Following", for example, indicates a travel mode in which a relative distance (an inter-vehicle distance) between the subject vehicle M and the front traveling vehicle is kept constant. In the following description, drive support control that supports the driving of the subject vehicle M in such a travel mode will be referred to as "following travel support control". In addition, when the front traveling vehicle is not recognized by the external recognizer 202, the following travel support controller 206 may simply allow the subject vehicle M to travel in the range of the setting vehicle speed.

The lane keeping support controller 208 controls the steering device 320 such that the host lane recognized by the subject vehicle position recognizer 204 is kept. For example, the lane keeping support controller 208 controls steering of the subject vehicle M such that the subject vehicle M travels along the center of the host lane. In the following description, drive support control that controls the subject vehicle M to travel along the center of the host lane will be referred to as "lane keeping support control".

Furthermore, when the subject vehicle M travels at a position deviated from the center of the host lane from side to side, the lane keeping support controller 208 performs off-road deviation suppression control. For example, the lane keeping support controller 208 performs the following control as the off-road deviation suppression control.

For example, when the subject vehicle M approaches the section line LM until a distance between the section line LM for partitioning the host lane and the subject vehicle M is equal to or less than a predetermined distance, the lane keeping support controller 208 calls the occupant's attention by vibrating the steering wheel. In this case, the HMI controller 120 causes various display devices of the HMI 20 to display an image or causes the speaker to output sound and the like, thereby notifying the occupant that the subject vehicle M has deviated from the host lane. After the steering wheel is vibrated, when there is no operation of the occupant with respect to the steering wheel (when a steering angle or steering torque is smaller than a threshold value), the lane keeping support controller 208 changes the direction of the turning wheel to the lane center side by controlling the steering device 320, and controls steering such that the subject vehicle M returns to the lane center side.

The lane change support controller 210, for example, includes a lane change possibility determiner 211 and a lane change executor 212.

When the winker lever 40a is operated, the lane change possibility determiner 211 determines the possibility of a lane change to a lane on the side of a winker that is operated according to a lever operation between the right and left winkers of the subject vehicle M (for example, a right adjacent lane when the right winker is operated). For example, the lane change possibility determiner 211 determines that the lane change is possible when all of the following conditions are satisfied, and determines that the lane change is not possible when any one of the conditions is not satisfied. In addition, instead of the presence or absence of the operation of the winker lever 40a, the lane change possibility determiner 211 may determine the possibility of the lane change according to the presence or absence of an operation of the lane change start switch 20b. Furthermore, the lane change possibility determiner 211 may sequentially determine whether the lane change is possible regardless of the presence or absence of the operation of the winker lever 40a or the lane change start switch 20b. In this case, when both the left adjacent lane and the right adjacent lane are recognized, that is, when there are two lanes to which the lane change is possible, the lane change possibility determiner 211 determines whether the following conditions are satisfied for each lane.

Condition (1): there is no obstacle in the lane (lane change destination)

Condition (2): the section line LM for partitioning between the lane (lane change destination) and the host lane is not a road sign indicating prohibition of lane change (prohibition of crossing)

Condition (3): the lane (lane change destination) is recognized (actually exists)

Condition (4): the yaw rate detected by the vehicle sensor 30 is smaller than the threshold value Condition (5): curvature radius of the current road is equal to or more than predetermined value Condition (6): the speed of the subject vehicle M is in a predetermined speed range Condition (7): other drive support control with higher priority than steering support control for lane change is not performed Condition (8): a predetermined time or more passes after the manual drive mode is switched to the drive support mode

[Determination Method of Condition (1)]

For example, in order to determine whether the condition (1) is satisfied, the lane change possibility determiner 211 sets a target position (hereinafter, referred to as a lane change target position TAs) which is the lane change destination in an adjacent lane, and determines whether a nearby vehicle exists in the lane change target position TAs as an obstacle.

Figure 3:
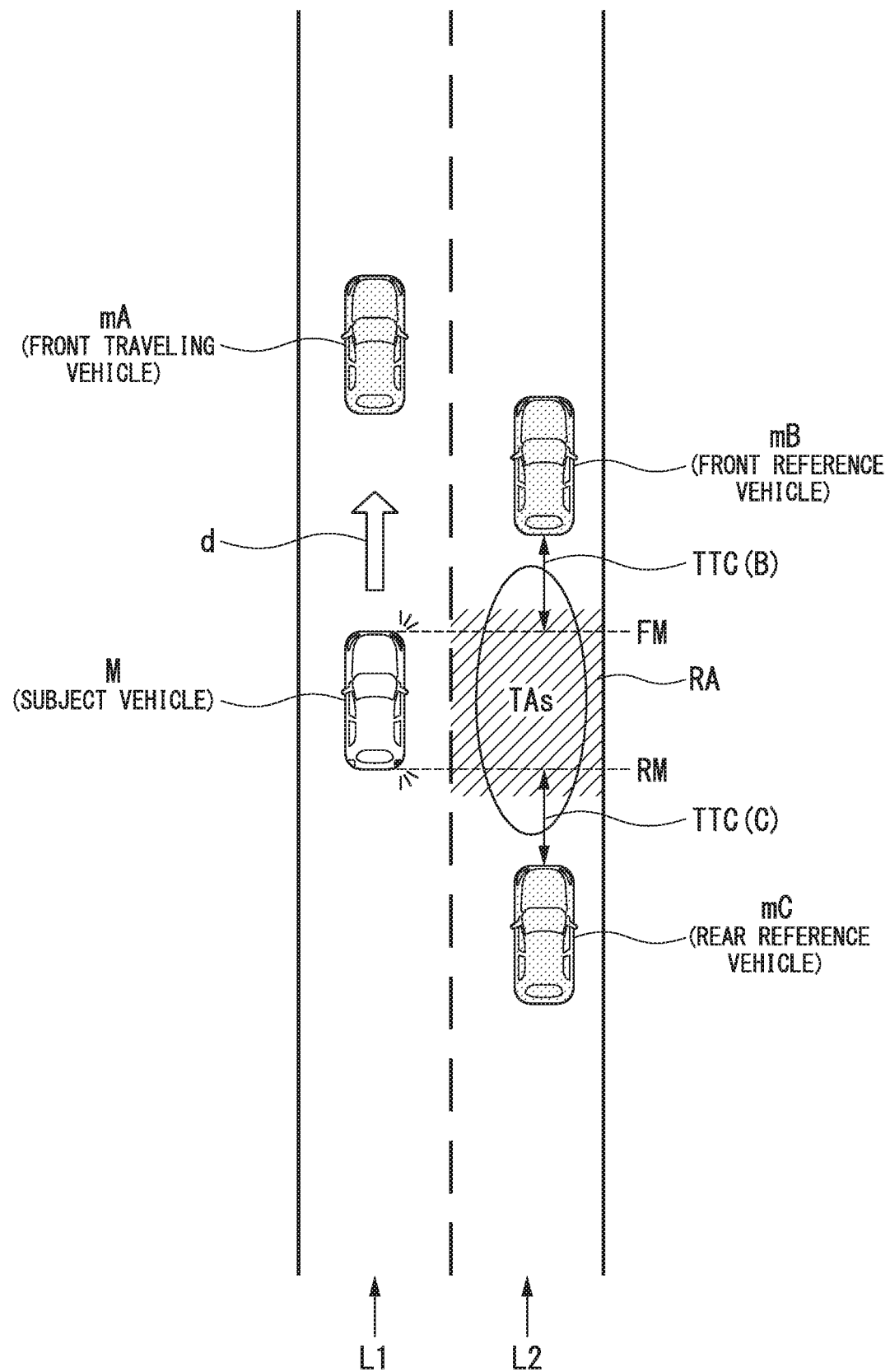
FIG. 3 is a diagram schematically illustrating a mode in which a lane change target position is set in an adjacent lane.

FIG. 3 is a diagram schematically illustrating a mode in which the lane change target position TAs is set on an adjacent lane. In FIG. 3, L1 denotes the host lane and L2 denotes a right adjacent lane. Furthermore, an arrow d denotes a proceeding (travel) direction of the subject vehicle M. For example, when a lane change to the right adjacent lane L2 is instructed by the operation of the winker lever 40a, the lane change possibility determiner 211 selects arbitrary two vehicles (for example, two vehicles relatively near the subject vehicle M) from nearby vehicles existing on the right adjacent lane L2, and sets the lane change target position TAs between the selected two nearby vehicles. For example, the lane change target position TAs is set at the center of the adjacent lane. In the following description, a nearby vehicle existing just before the set lane change target position TAs will be referred to as a "front reference vehicle mB" and a nearby vehicle existing just after the lane change target position TAs will be referred to as a "rear reference vehicle mC". The lane change target position TAs is a relative position based on a positional relation between the subject vehicle M and the front reference vehicle mB/the rear reference vehicle mC.

The lane change possibility determiner 211 sets the lane change target position TAs, and then sets an prohibition area RA as illustrated in FIG. 3 based on the set position of the lane change target position TAs. For example, the lane change possibility determiner 211 projects the subject vehicle M onto the adjacent lane L2 which is the lane change destination, and sets an area, where there is a slight margin distance before and after the projected subject vehicle M, as the prohibition area RA. The prohibition area RA is set as an area extending from one section line LM for partitioning the adjacent lane L2 to the other section line LM.

When even a part of a nearby vehicle does not exist in the set prohibition area RA, a time to collision (TTC) B between the subject vehicle M and the front reference vehicle mB is larger than a threshold value Th (B), and a time to collision (TTC) C between the subject vehicle M and the rear reference vehicle mC is larger than a threshold value Th (C), the lane change possibility determiner 211 determines that the condition (1) is satisfied. The "even a part of a nearby vehicle does not exist in the prohibition area RA", for example, indicates that the prohibition area RA and an area indicating the nearby vehicle do not overlap each other when viewed from above. Furthermore, the time to collision (TTC) B, for example, is derived by dividing a distance between the front reference vehicle mB and an extension line FM, which is obtained by virtually extending a front end of the subject vehicle M to the adjacent lane L2 side, by a relative speed of the subject vehicle M and the front reference vehicle mB. Furthermore, the time to collision (TTC) C, for example, is derived by dividing a distance between the rear reference vehicle mC and an extension line RM, which is obtained by virtually extending a rear end of the subject vehicle M to the adjacent lane L2 side, by a relative speed of the subject vehicle M and the rear reference vehicle mC. The threshold value Th (B) and the threshold value Th (C) may be the same value or may be values different from each other.

When the condition (1) is not satisfied, the lane change possibility determiner 211 selects other two vehicles from the nearby vehicles existing on the right adjacent lane L2, and newly sets the lane change target position TAs, thereby repeating the determination process regarding whether the condition (1) is satisfied. In this case, the drive support controller 200 may control the speed of the subject vehicle M such that a current speed is kept or accelerate/decelerate the subject vehicle M such that the subject vehicle M moves to the lateral side of the lane change target position TAs, until the lane change target position TAs is set to satisfy the condition (1).

In addition, when even one nearby vehicle does not exist on the right adjacent lane L2 at the time of setting of the lane change target position TAs, the lane change possibility determiner 211 may determine that the condition (1) is satisfied from the fact that there is no interfered nearby vehicle in the prohibition area RA. Furthermore, when only one nearby vehicle exists on the adjacent lane L2 at the time of setting of the lane change target position TAs, the lane change possibility determiner 211 may set the lane change target position TAs in arbitrary position in the front or rear of the nearby vehicle.

[Determination Method of Condition (2)]

For example, the lane change possibility determiner 211 determines whether the condition (2) is satisfied according to the type of the section line between the host lane and the adjacent lane (the lane change destination) recognized by the subject vehicle position recognizer 204, that is, the type of the section line needs to be across in a lane change. For example, when the section line between the host lane and the adjacent lane (the lane change destination) is a road sign (for example, a yellow solid line) indicating the prohibition of the lane change or the prohibition of protrusion, the lane change possibility determiner 211 determine that the condition (2) is not satisfied. When the section line is a road sign (for example, a white broken line) indicating that it is not, the lane change possibility determiner 211 determine that the condition (2) is satisfied.

[Determination Method of Condition (3)]

For example, in a case where a lane change is instructed by the operation of the winker lever 40a or the lane change start switch 20b, when a lane instructed as the lane change destination is not recognized by the subject vehicle position recognizer 204, the lane change possibility determiner 211 determine that the condition (3) is not satisfied. When the lane is recognized by the subject vehicle position recognizer 204, the lane change possibility determiner 211 determine that the condition (3) is satisfied. In this way, for example, even when a lane change to a side, at which no adjacent lane exists, is instructed by an erroneous operation of an occupant, since the subject vehicle position recognizer 204 does not recognize a lane instructed as the lane change destination, the lane change is not started.

[Determination Method of Condition (4)]

For example, the lane change possibility determiner 211 determines whether the condition (4) is satisfied according to whether a yaw rate detected by the vehicle sensor 30 is smaller than a threshold value. The threshold value, for example, is set to a yaw rate to the extent that an overload (indicating that an acceleration in a vehicle width direction is equal to or more than a threshold value) does not occurs in an occupant when a lane change has been performed. The lane change possibility determiner 211 determines that the condition (4) is not satisfied when the yaw rate is equal to or more than the threshold value, and determines that the condition (4) is satisfied when the yaw rate is smaller than the threshold value.

[Determination Method of Condition (5)]

For example, the lane change possibility determiner 211 determines whether the condition (5) is satisfied according to whether a curvature radius of a road under travel is equal to or more than a predetermined value. The predetermined value, for example, is set to a curvature radius (for example, about 500 m) in which an overload does not occurs in an occupant when the subject vehicle M travels along the road. In addition, the predetermined value may be set to a value (for example, about 200 m) becoming smaller as the speed of the subject vehicle M is decreased, or a value (for example, about 1,000 m) becoming larger as the speed of the subject vehicle M is increased.

[Determination Method of Condition (6)]

For example, the lane change possibility determiner 211 determines whether the condition (6) is satisfied according to whether the speed of the subject vehicle M is in a predetermined speed range. The predetermined speed range, for example, is set to a speed band of about 70 km/h to about 110 km/h. The lane change possibility determiner 211 determines that the condition (6) is not satisfied when the speed of the subject vehicle M is not in the predetermined speed range, and determines that the condition (6) is satisfied when the speed of the subject vehicle M is in the predetermined speed range.

[Determination Method of Condition (7)]

For example, the lane change possibility determiner 211 determines whether the condition (7) is satisfied according to whether another drive support control with a priority higher than that of steering support control for a lane change is performed. For example, the drive support control with the highest priority is brake control (hereinafter, referred to as automatic brake control) that automatically decelerates the subject vehicle M in correspondence to an obstacle. For example, the lane change possibility determiner 211 determines that the condition (7) is not satisfied when the automatic brake control is performed at the time of lane change possibility determination, and determines that the condition (7) is satisfied when the automatic brake control is not performed at the time of the lane change possibility determination.

[Determination Method of Condition (8)]

For example, the lane change possibility determiner 211 determines whether the condition (8) is satisfied according to a time passed after the drive mode of the subject vehicle M is switched by the switching controller 110 from the manual drive mode to the drive support mode. For example, the lane change possibility determiner 211 determines that the condition (8) is not satisfied when a predetermined time or more has not passed after the drive mode is switched to the drive support mode, and determines that the condition (8) is satisfied when the predetermined time or more has passed after the drive mode is switched to the drive support mode. The predetermined time, for example, is set to about 2 seconds. In this way, under the drive support mode, the lane change can be started after the state of the subject vehicle M is shifted to a steady state.

In addition, the lane change possibility determiner 211 may sequentially determine whether the lane change is possible regardless of the presence or absence of the operation of the winker lever 40a or the lane change start switch 20b.

In this case, when both the left adjacent lane and the right adjacent lane are recognized, that is, when there are two lanes to which the lane change is possible, the lane change possibility determiner 211 determines whether the aforementioned conditions are satisfied for each lane.

When it is determined by the lane change possibility determiner 211 that the lane change is possible, the lane change executor 212 controls the travel driving force output device 300, the brake device 310, and the steering device 320 independently of an operation (steering control) of a steering wheel by an occupant, thereby changing a lane of the subject vehicle M with respect to the adjacent lane (the adjacent lane on which the lane change target position TAs has been set) determined that the lane change is possible.

For example, on the basis of a relative speed with nearby vehicles (the front reference vehicle mB and the rear reference vehicle mC) before and after the lane change target position TAs set by the lane change possibility determiner 211, and a relative distance to the lane change target position TAs, the lane change executor 212 decides a target speed until the subject vehicle M reaches the lane change target position TAs, and controls the travel driving force output device 300 and the brake device 310 such that the speed of the subject vehicle M approaches the decided target speed. Furthermore, on the basis of a relative distance related to a vehicle proceeding direction to the lane change target position TAs and a relative distance related to a vehicle width direction, the lane change executor 212 decides a target steering angle until the subject vehicle M reaches the lane change target position TAs, and controls the steering device 320 such that the steering angle of the subject vehicle M approaches the decided target steering angle. In the following description, the drive support control for changing the lane of the subject vehicle M from the host lane to an adjacent lane will be referred to as "automatic lane change support control".

[One Situation in which Automatic Lane Change Support Control is Performed]

Figure 4:
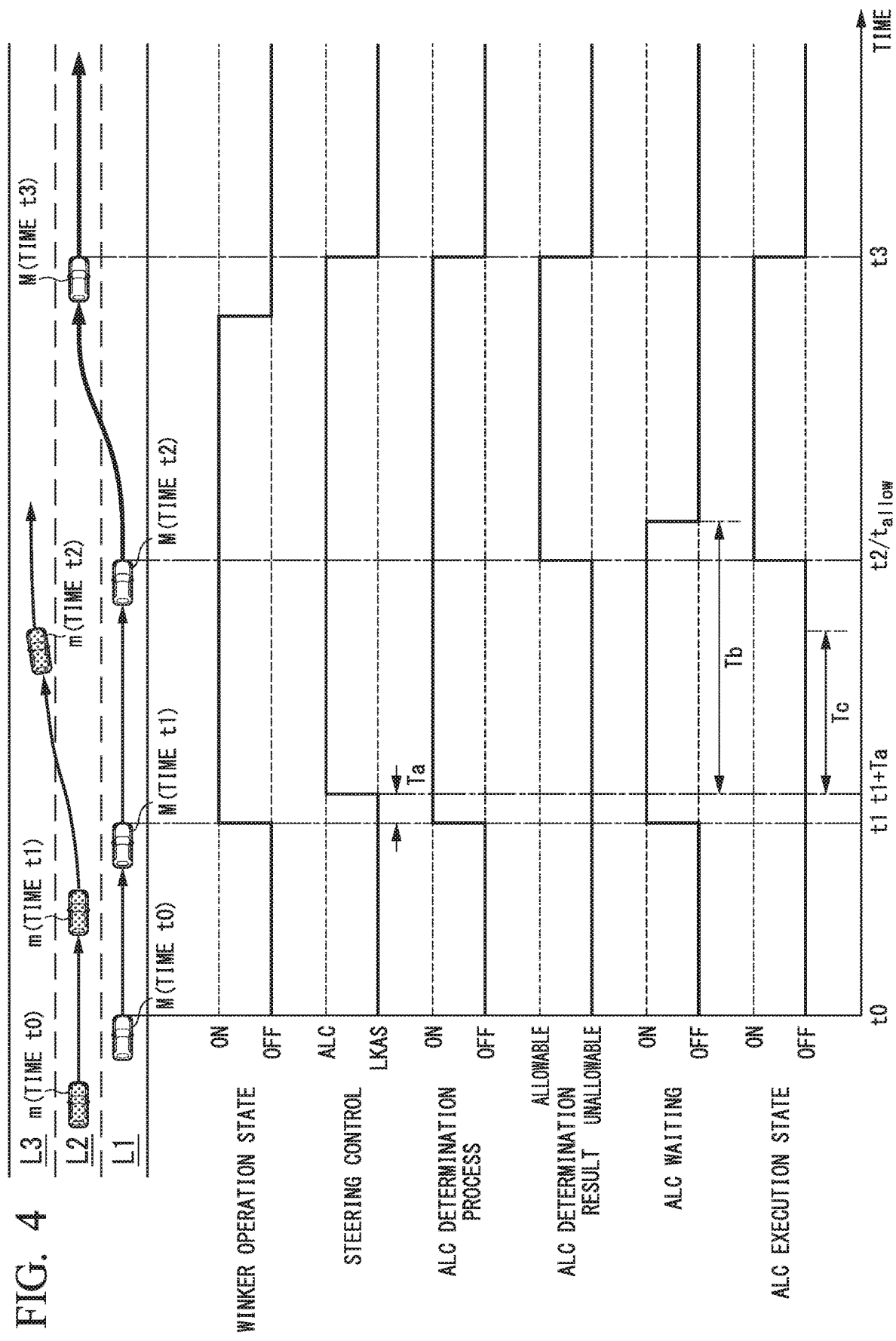
FIG. 4 is a diagram illustrating a situation in which automatic lane change support control is performed, together with a timing chart illustrating a timing of each control.

FIG. 4 is a diagram illustrating a situation in which the automatic lane change support control is performed, together with a timing chart illustrating a timing of each control. In FIG. 4, auto lane change (ALC) denotes the automatic lane change support control and lane keeping assist system (LKAS) denotes the lane keeping support control.

In the illustrated example, at the time point of time t0, no winker is operated and a control mode when controlling the steering device 320 is the lane keeping assist system (LKAS). Accordingly, at the time point of time t0, a determination process for the automatic lane change support control (ALC), that is, the lane change possibility determination process is not started (an OFF state is kept).

The time point of time t1 indicates a timing at which the winker lever 40a has been operated by an occupant. In this case, the winker starts to be operated (the winder operation state is switched from the OFF state to an ON state). In the illustrated example, the left winker of the subject vehicle M is operated and a lane change to the left adjacent lane L2 is instructed.

Furthermore, at the time t1, the functional unit for controlling the steering device 320 by receiving the operation of the winker is switched from the lane keeping support controller 208 to the lane change support controller 210. That is, the control authority of the steering device 320 is changed from the lane keeping support controller 208 to the lane change support controller 210. Furthermore, a first predetermined time Ta is provided to continue determination until determining a result whether the winker lever 40a has been operated or has not been operated. When the winker lever 40a has been continuously operated until the first predetermined time Ta passes from the time t1 at which the winker lever 40a has started to be operated, the lane change possibility determiner 211 determines that there is an intention to instruct an occupant to perform a lane change, and starts various types of control. On the other hand, when the winker lever 40a has not been operated before the first predetermined time Ta passes from the time t1 at which the winker lever 40a has started to be operated, the lane change possibility determiner 211 determines that there is no intention to instruct an occupant to perform a lane change, and does not start various types of control.

As described above, in the case where the first predetermined time Ta is provided, when an occupant erroneously contacts with the winker lever 40a while operating a steering wheel 44, if the occupant operates the winker lever 40a without any intention while operating a light switch and the like for turning on a head light, or if chattering occurs in an operation of the winker lever 40a, it is possible to prevent the automatic lane change support control from being performed on the basis of an erroneous lane change instruction. Furthermore, until the first predetermined time Ta passes from the time t1 at which the winker lever 40a has started to be operated, since the lane change support controller 210 has no control authority of the steering device 320, even though it is determined by the lane change possibility determiner 211 that the lane change is possible, the automatic lane change support control (ALC) is not started.

Furthermore, at the time t1, the lane change possibility determiner 211 receives the fact that the winker has been operated, and starts the lane change possibility determination process. In the illustrated example, a state in which the lane change possibility determination process is performed is indicated by an "ON state" and a state in which the lane change possibility determination process is not performed is indicated by an "OFF state". Furthermore, in the illustrated example, it is not still determined that the lane change is possible at the time point of time t1 ("non-possibility" in the drawing).

Furthermore, the lane change possibility determiner 211 receives the fact that the winker has been operated, and start to count time. For example, as illustrated in the drawing, the lane change possibility determiner 211 may start the time counting from a time point (t1+Ta) at which the first predetermined time Ta has passed after the time t1 which is the operation timing of the winker, or may start the time counting from the time t1 without considering the first predetermined time Ta.

When the counted time is longer than a third predetermined time Tc and is shorter than a second predetermined time Tb, the lane change possibility determiner 211 permits the execution of the automatic lane change support control (ALC), and in other cases, the lane change possibility determiner 211 prohibits the execution of the automatic lane change support control (ALC). The second predetermined time Tb is set to a time longer than the third predetermined time Tc. The third predetermined time Tc is a time set in order to make a nearby vehicle know the intention of a lane change of the subject vehicle M. In other words, the third predetermined time Tc is a time set in order to continue turn-on (turn-off) of a winker for some time while keeping traveling along the host lane. For example, the second predetermined time Tb is set to about 10 seconds and the third predetermined time Tc is set to about several seconds. The third predetermined time Tc is an example of a "predetermined time" and the second predetermined time Tb is an example of a "reference time".

For example, until the third predetermined time Tc passes after the time counting is started, even when it has been determined that the lane change is possible, the lane change possibility determiner 211 prohibits the execution of the automatic lane change support control (ALC). In this case, since it has already been determined by the lane change possibility determiner 211 that the lane change is possible, the lane change executor 212 performs the automatic lane change support control (ALC) at a time point t1+Ta+Tc at which the third predetermined time Tc has been exceeded.

Furthermore, in a case where the third predetermined time Tc passes and the second predetermined time Tb does not pass after the time counting is started, when it is determined by the lane change possibility determiner 211 that the lane change is possible, the lane change executor 212 performs the automatic lane change support control (ALC).

In the illustrated example, at a time t2 at which the third predetermined time Tc passes and the second predetermined time Tb does not pass after the time counting is started, the external recognizer 202 recognizes a lane change to another lane L3 as a behavior state of a nearby vehicle m which may be an obstacle on the adjacent lane L2 (the lane change destination). Accordingly, the lane change possibility determiner 211 determines that the condition (1) is satisfied. In this case, when the other conditions (2) to (8) are satisfied, the lane change possibility determiner 211 determines that the lane change is possible at the same time as the time t2 as illustrated in the example. In the following description, the time determined that the lane change is possible will be referred to as $t_{allow}$.

Before the second predetermined time Tb passes after the time counting is started, since it is determined by the lane change possibility determiner 211 that the lane change is possible ($t_{allow}$<t1+Ta+Tb), the lane change executor 212 starts the automatic lane change support control (ALC) (switches the OFF state to the ON state).

Then, the lane change executor 212 stops the automatic lane change support control (ALC) at a time point at which the lane change to the adjacent lane L2 (the lane change destination) has been completed. The "time point at which the lane change has been completed", for example, indicates a timing at which the subject vehicle M has reached the center of the adjacent lane L2. In the illustrated example, at a time t3, the automatic lane change support control (ALC) is stopped. As the automatic lane change support control (ALC) is stopped, the lane change possibility determiner 211 may stop the lane change possibility determination process. Furthermore, as the automatic lane change support control (ALC) is stopped, the control authority of the steering device 320 is changed from the lane change support controller 210 to the lane keeping support controller 208. That is, the lane keeping assist system (LKAS) stopped during the execution of the automatic lane change support control (ALC) is restarted.

When a condition for permitting the lane change is not satisfied, the lane change possibility determiner 211 may repeatedly set the lane change target position TAs until the second predetermined time Tb passes, and search for a space for the lane change destination.

[Another Situation in which Automatic Lane Change Support Control is Performed]

Figure 5:
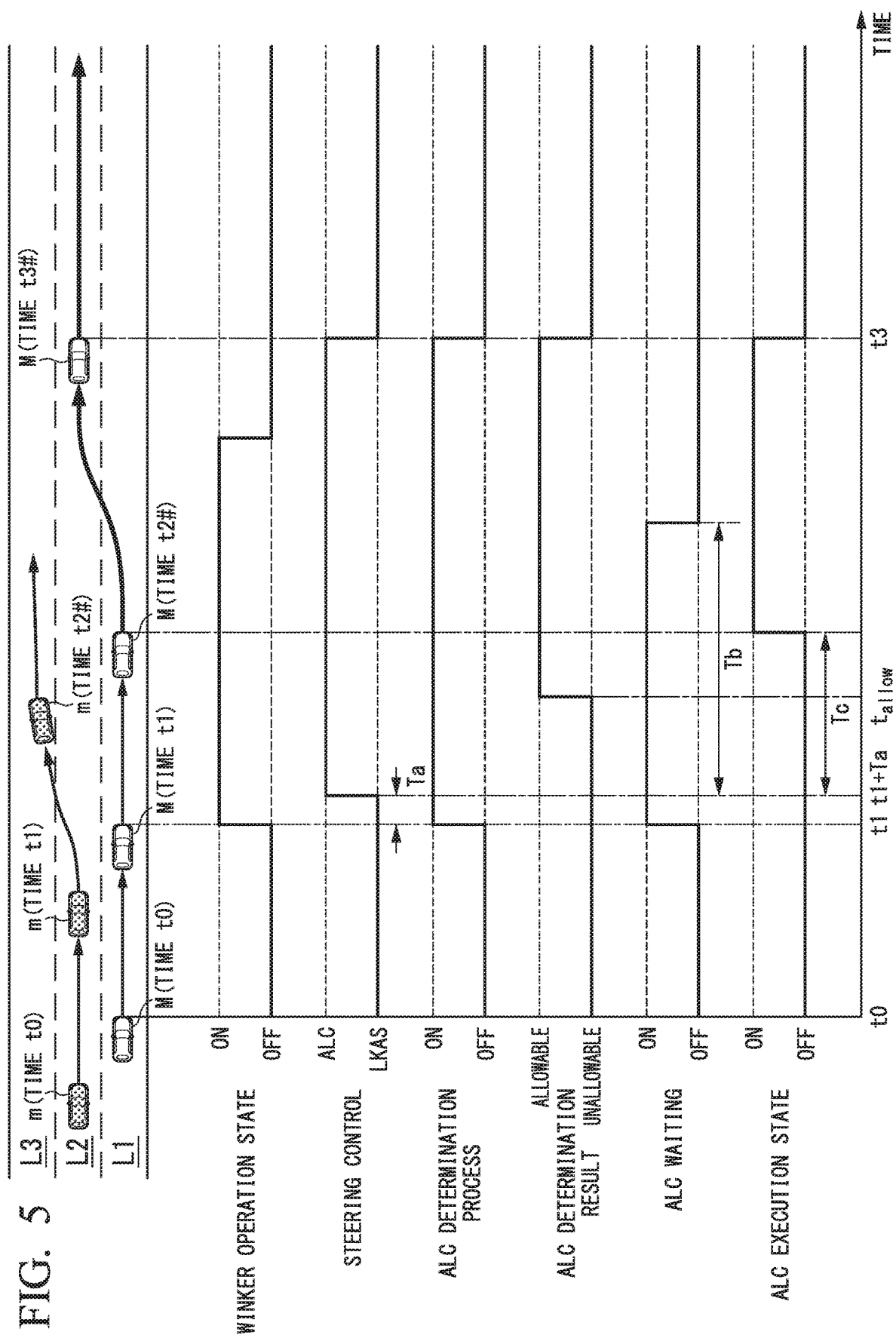
FIG. 5 is a diagram illustrating a situation in which automatic lane change support control is performed, together with a timing chart illustrating a timing of each control.

FIG. 5 is a diagram illustrating a situation in which the automatic lane change support control is performed, together with a timing chart illustrating a timing of each control. In an example of FIG. 5, before a time t2#(=t1+Ta+Tb) at which the third predetermined time Tc passes after the time counting is started, it is determined by the lane change possibility determiner 211 that the lane change is possible ($t_{allow}$<t2#). In this case, since the execution of the automatic lane change support control (ALC) is prohibited until the third predetermined time Tc passes, the lane change executor 212 waits for the execution of the automatic lane change support control until the third predetermined time Tc passes. Then, the lane change executor 212 starts the automatic lane change support control (ALC) at the time point t2# at which the third predetermined time Tc is reached. In this way, since no lane change is started until at least the third predetermined time Tc passes, it is possible to sufficiently make a nearby vehicle know a lane change intention. Even when the control mode when controlling the control authority of the steering device 320 is shifted from the lane keeping assist system (LKAS) to the automatic lane change support control (ALC), until the third predetermined time Tc passes and it is determined by the lane change possibility determiner 211 that the lane change is possible, the lane keeping assist system (LKAS) is kept. That is, the automatic lane change support control (ALC) is control that continues control for keeping the host lane until the lane change actually becomes possible.

[Situation in which Automatic Lane Change Support Control is not Performed]

Figure 6:
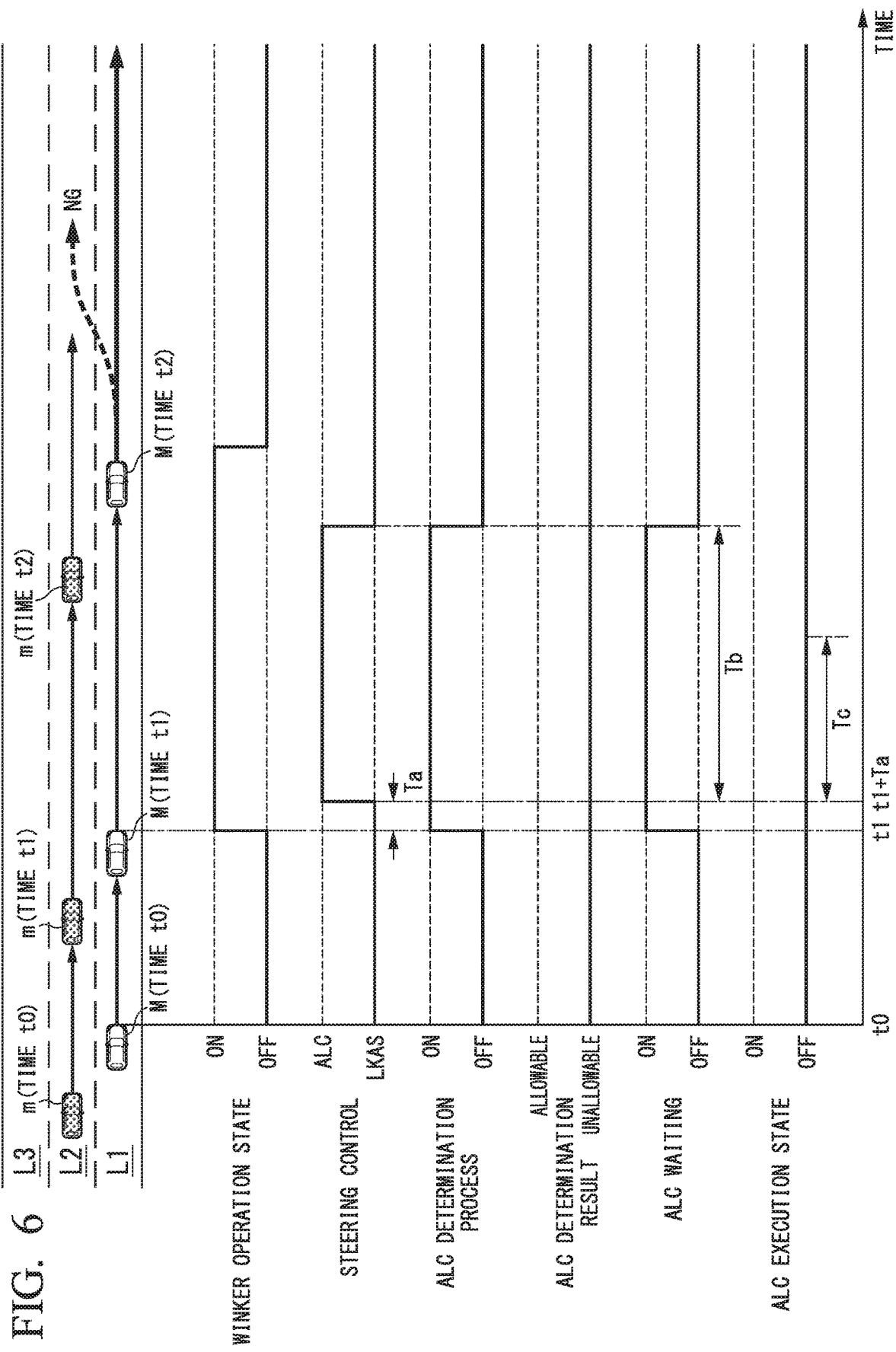
FIG. 6 is a diagram illustrating a situation in which automatic lane change support control is performed, together with a timing chart illustrating a timing of each control.

FIG. 6 is a diagram illustrating a situation in which the automatic lane change support control is not performed, together with a timing chart illustrating a timing of each control. In an example of FIG. 6, until the second predetermined time Tb passes after the time counting is started, it is not determined by the lane change possibility determiner 211 that the lane change is possible. In this case, at a time point at which the second predetermined time Tb has been exceeded, since the execution of the automatic lane change support control (ALC) is prohibited by the lane change possibility determiner 211, the lane change executor 212 stops the lane change being waited. In this case, the lane change possibility determiner 211 may stop the lane change possibility determination process without execution. Furthermore, when the lane change is stopped by the lane change executor 212 (when the automatic lane change support control to be performed is not performed), the lane keeping support controller 208 continues the lane keeping support control.

[Processing Flow]

Figure 7:
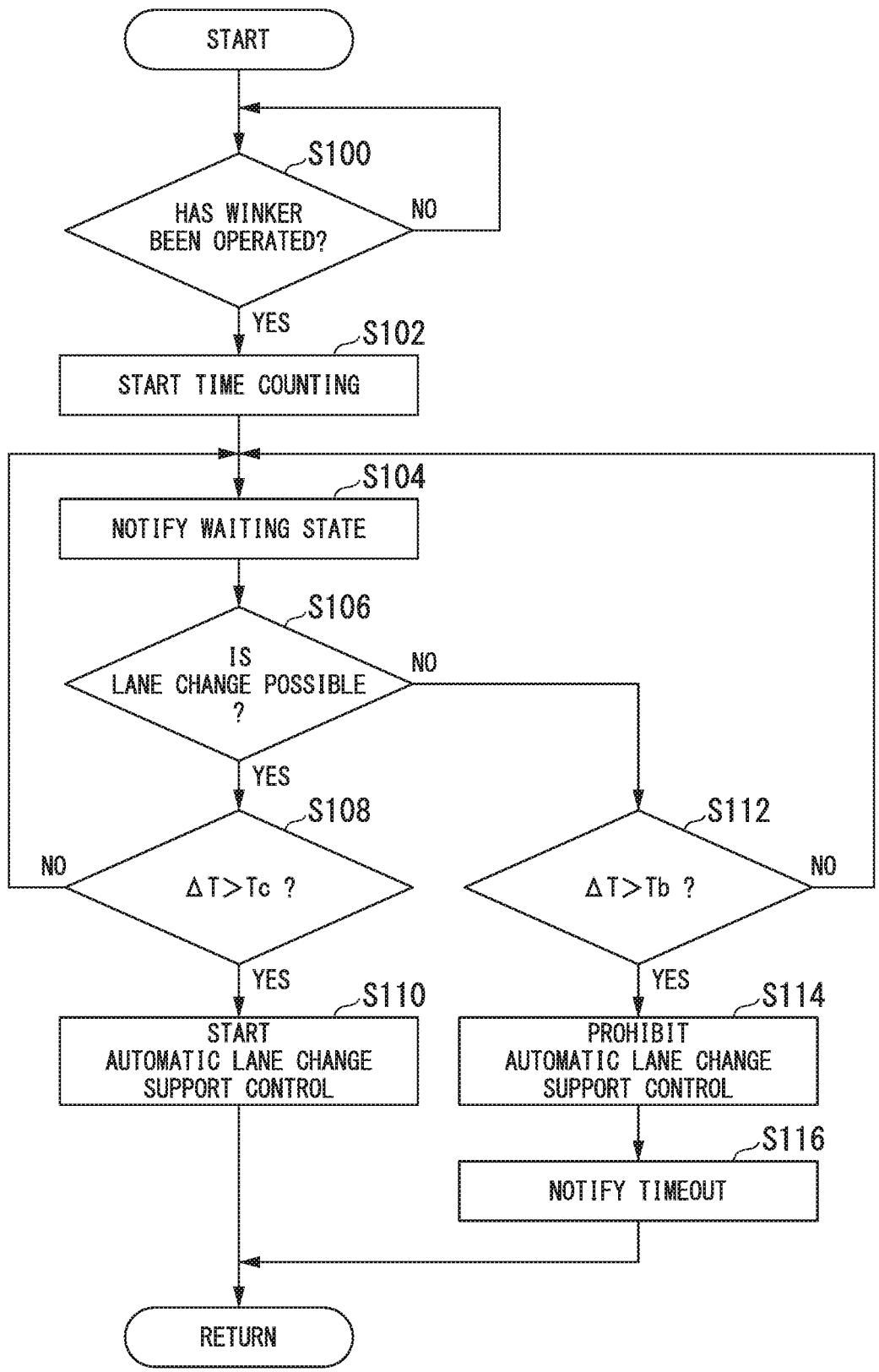
FIG. 7 is a flowchart illustrating a series of processes by a master controller and a drive support controller in an embodiment.

FIG. 7 is a flowchart illustrating a series of processes by the master controller 100, the drive support controller 200 in an embodiment. For example, the procedure of the present flowchart may be repeated at a predetermined cycle in the drive support mode.

Firstly, on the basis of a detection signal of the operation detector provided to the winker lever 40a, the lane change possibility determiner 211 determines whether the winker lever 40a has been operated (step S100). The lane change possibility determiner 211 may determines whether the lane change start switch 20b has been operated, instead of the winker lever 40a.

When it is determined that the winker lever 40a has been operated or when it is determined that the lane change start switch 20b has been operated, the lane change possibility determiner 211 starts to count time (step S102).

Next, the HMI controller 120 controls the HMI 20 to notify an occupant that a lane change instructed by the operation of the winker lever 40a is waited without being performed (step S104).

Figure 8:
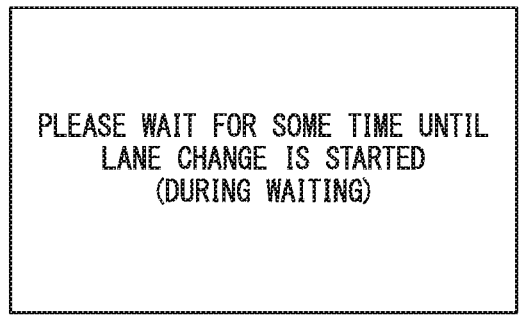
FIG. 8 is a diagram illustrating an example of a screen displayed on a display device of an HMI at the time of waiting for a lane change.

FIG. 8 is a diagram illustrating an example of a screen displayed on the display device of the HMI 20 at the time of waiting of the lane change. For example, the HMI controller 120 notifies an occupant that the lane change is waited by allowing each display device of the HMI 20 to display a screen as illustrated in FIG. 8. Furthermore, the HMI controller 120 may notify the occupant that the lane change is waited by allowing the speaker of the HMI 20 to output sound and the like. In addition, until the procedure proceeds to step S110 or step S116 to be described, the HMI controller 120 may allow the display device to continuously display a screen for notifying that the lane change is waited. The screen output by the HMI 20 at the time of the waiting of the lane change is an example of "standby information".

Next, the lane change possibility determiner 211 determines whether a lane change to an adjacent lane of a side of a winker operated by the operation of the winker lever 40a is possible (step S106).

When it is determined that the lane change is possible, the lane change possibility determiner 211 compares a counted time ΔT and the third predetermined time Tc with each other and determines whether the counted time ΔT exceeds the third predetermined time Tc (step S108). When it is determined that the counted time ΔT does not exceed the third predetermined time Tc, the lane change possibility determiner 211 returns the procedure to step S104. In this way, until the third predetermined time Tc passes after the time counting is started, the lane change is waited.

On the other hand, when it is determined by the lane change possibility determiner 211 that the counted time ΔT exceeds the third predetermined time Tc, the lane change executor 212 starts the automatic lane change support control (step S110). In this way, the awaited lane change is performed.

Figure 9:
FIG. 9 is a diagram illustrating an example of a screen displayed on the display device of the HMI at the time of start of automatic lane change support control.

FIG. 9 is a diagram illustrating an example of a screen displayed on the display device of the HMI 20 at the time of the start of the automatic lane change support control. For example, the HMI controller 120 switches a screen to be displayed on each display device of the HMI 20 from the screen (for example, see FIG. 8) for notifying that the lane change is waited to the screen as illustrated in FIG. 9, thereby notifying an occupant that the lane change is started. Furthermore, the HMI controller 120 may allow the speaker of the HMI 20 to output sound and the like, thereby notifying the occupant that the lane change is started.

On the other hand, when it is determined that the lane change is not possible in the process of step S106, the lane change possibility determiner 211 compares the counted time ΔT and the second predetermined time Tb with each other and determines whether the counted time ΔT exceeds the second predetermined time Tb (step S112). When it is determined that the counted time ΔT does not exceed the second predetermined time Tb, the lane change possibility determiner 211 returns the procedure to step S104. In this way, until the second predetermined time Tb passes after the time counting is started, it is continuously determined whether the lane change is possible.

On the other hand, when it is determined that the counted time ΔT exceeds the second predetermined time Tb, the lane change possibility determiner 211 prohibits the execution of the automatic lane change support control (step S114). In this way, the awaited lane change is stopped without execution.

Next, the HMI controller 120 controls the HMI 20 to notify an occupant that the execution of the lane change is timed out (step S116). In this way, the procedure of the present flowchart is ended.

Figure 10:
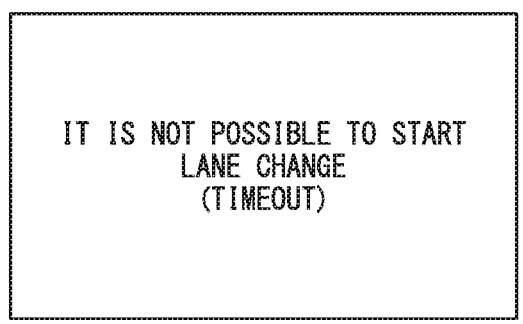
FIG. 10 is a diagram illustrating an example of a screen displayed on the display device of the HMI at the time of timeout.

FIG. 10 is a diagram illustrating an example of a screen displayed on the display device of the HMI 20 at the time of the timeout. For example, the HMI controller 120 switches a screen to be displayed on each display device of the HMI 20 from the screen (for example, see FIG. 8) for notifying that the lane change is waited to the screen as illustrated in FIG. 10, thereby notifying an occupant of the timeout. That is, the HMI controller 120 controls the HMI 20 to stop the output of information for notifying waiting of the lane change, thereby allowing information for notifying the timeout to be newly output. The screen output by the HMI 20 at the time of the timeout of the lane change is an example of "stop information".

Figure 11:
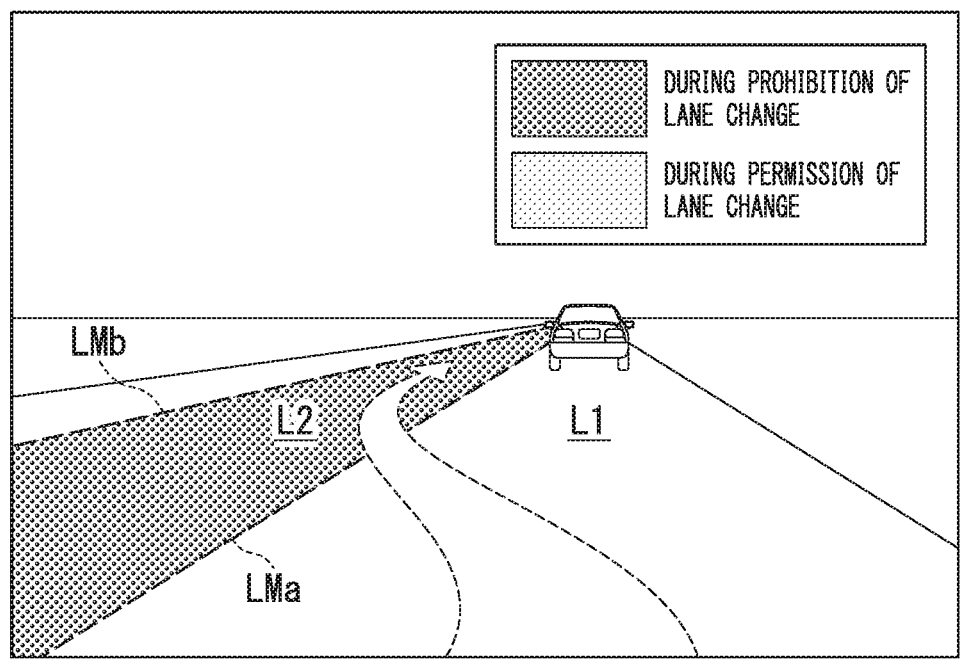
FIG. 11 is a diagram illustrating an example of comparison of a screen example when a lane change is not performed but is waited for and a screen example when a lane change is performed.
Figure 12:
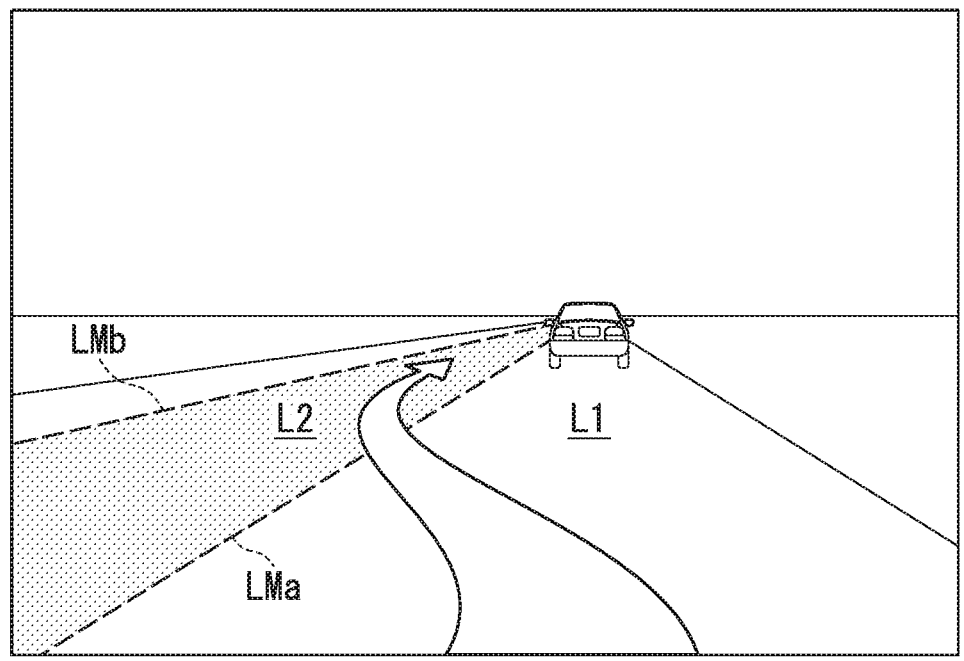
FIG. 12 is a diagram illustrating an example of comparison of a screen example when a lane change is not performed but is waited for and a screen example when a lane change is performed.

FIG. 11 and FIG. 12 are diagrams illustrating an example of comparison of a screen example when a lane change is not performed and is waited and a screen example when the lane change is performed. FIG. 11 illustrates a screen example when the lane change is waited and FIG. 12 illustrates a screen example when the lane change is performed. In the drawings, L1 denotes a host lane and L2 denotes an adjacent lane which is a lane change destination. For example, in the process of step S104 of the aforementioned flowchart, the HMI controller 120 allows a screen (hereinafter, referred to as a screen A) as illustrated in FIG. 11 to be displayed. On the screen A, between two section lines LMa and LMb for partitioning the adjacent lane L2, only the section line LMa (a section line needs to be across in a lane change) considered in the condition (2) when determining lane change possibility may be displayed, or both of them may be displayed. For example, the HMI controller 120 may allow an area of a lane such as the travel lane L1 and the adjacent lane L2 to be highlighted with a predetermined color, pattern and the like. Furthermore, the HMI controller 120 may allow the section line and the lane to be displayed while being turning on/off, or may allow a track, which is predicted to be passed in a lane change, to be displayed.

In contrast, in the process of step S110 of the aforementioned flowchart, the HMI controller 120 allows a screen (hereinafter, referred to as a screen B) as illustrated in FIG. 12 to be displayed. In this case, the HMI controller 120 differentiates a display mode of a section line and a lane to be displayed on the screen B from the display mode of the section line and the lane displayed on the screen A. In the "differentiating the display mode", for example, a color, a flickering cycle, the size of a line, and the like are changed. In this way, the start of the lane change is notified to an occupant.

Figure 13:
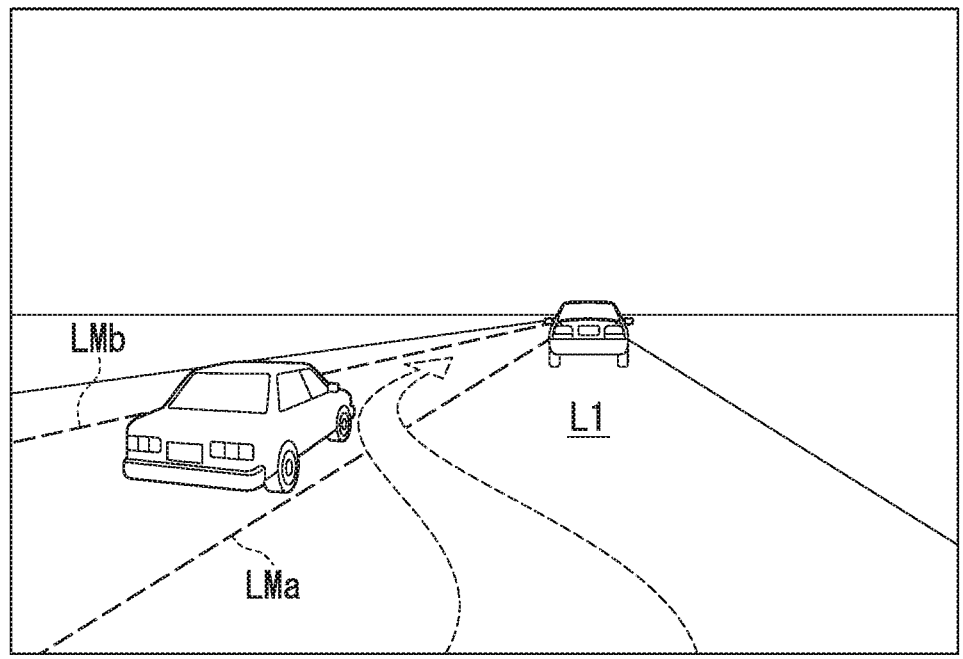
FIG. 13 is a diagram illustrating another example of comparison of a screen example when a lane change is not performed but is waited for and a screen example when a lane change is performed.
Figure 14:
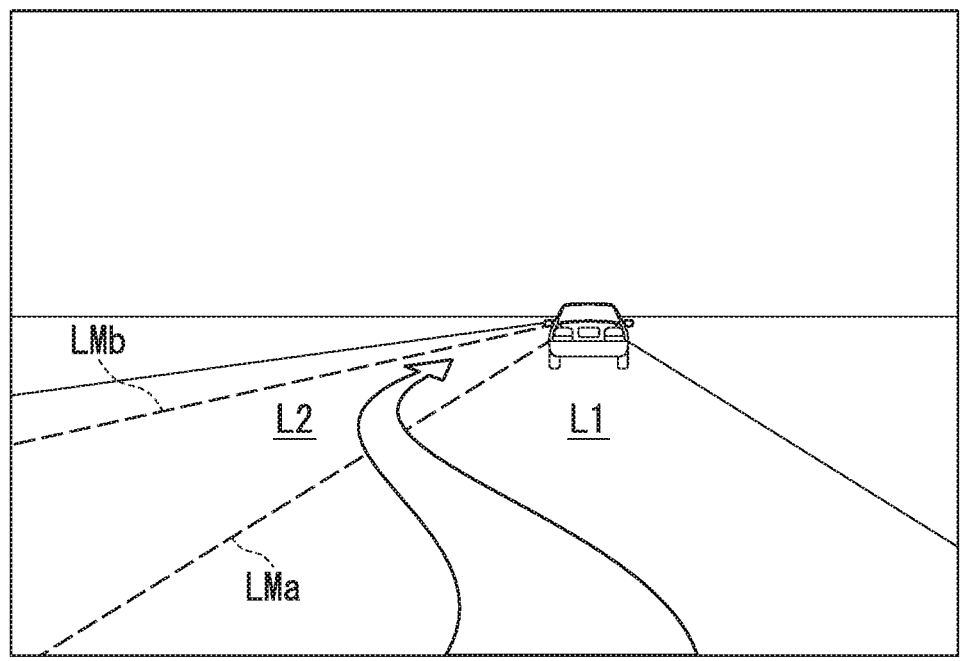
FIG. 14 is a diagram illustrating another example of comparison of a screen example when a lane change is not performed but is waited for and a screen example when a lane change is performed.

Furthermore, the HMI controller 120 may notify an occupant that an awaited lane change is started according to the presence or absence of display of a nearby vehicle. FIG. 13 and FIG. 14 are diagrams illustrating other examples of comparison of a screen example when a lane change is waited without execution and a screen example when the lane change is performed. As illustrated in the examples, when there is a nearby vehicle on the adjacent lane L2, the HMI controller 120 may allow the nearby vehicle to be displayed on the screen A as illustrated in FIG. 13 and allow the nearby vehicle not to be displayed on the screen B as illustrated in FIG. 14, thereby notifying an occupant that the lane change is started. Furthermore, the HMI controller 120 may allow a section line not to be displayed or may allow only the nearby vehicle to be simply displayed.

The aforementioned embodiment includes the external recognizer 202 that recognizes a surrounding situation of the subject vehicle M, and the lane change support controller 210 that determines whether a lane change by the subject vehicle M is possible on the basis of the surrounding situation recognized by the external recognizer 202, and changes a lane of the subject vehicle M to another lane, independently of a steering operation of an occupant of the subject vehicle M, on the basis of the presence or absence of an operation of a winker and a determination result of the lane change possibility, wherein since the lane change support controller 210 decides a starting timing of the lane change on the basis of whether the third predetermined time Tc (an example of a "predetermined time" in the scope of claims) has passed after the winker is operated, even when the winker is operated and a condition for starting the lane change is satisfied for example, it is possible to keep the execution of the lane change waiting until the third predetermined time Tc passes. As a consequence, it is possible to perform the lane change in consideration of a nearby vehicle or an occupant.

Furthermore, according to the aforementioned embodiment, when it is determined that the lane change is possible before the third predetermined time Tc passes, the lane change is performed at a time point at which the third predetermined time Tc has passed, so that it is possible to prevent the lane change from being immediately started at a time point at which the lane change has become possible, and to make a nearby vehicle or an occupant know that a subject vehicle performs the lane change from now.

Furthermore, according to the aforementioned embodiment, when it is determined that the lane change is possible after the third predetermined time Tc passes, the lane change is started after the determination, so that it is possible to make a nearby vehicle or an occupant sufficiently know the execution of the lane change and then to perform the lane change.

Furthermore, according to the aforementioned embodiment, until the lane change is started after the winker is operated, an occupant is notified of that the lane change is waited, so that the occupant can recognize the reason that the lane change is not started, regardless of a lane change instruction.

Furthermore, according to the aforementioned embodiment, until the second predetermined time Tb longer than the third predetermined time Tc passes after the winker is operated, when a condition for the lane change is not satisfied, that is, when a waiting time of the lane change becomes long as there is great separation between a timing at which an occupant has operated the winker for a lane change instruction and an actual start timing of the lane change, the awaited lane change is stopped, so that it is possible to perform the lane change at a more appropriate timing.

<Modification Example of Embodiment>

Hereinafter, an modification example of the embodiment will be described. In the aforementioned embodiment, the waiting, prohibition, or start of a lane change is decided according to whether the time Δt counted after the winker is operated passes the second predetermined time Tb or the third predetermined time Tc. In contrast, in the modification example of the embodiment, a travel distance of the subject vehicle M is measured after the winker is operated, and the waiting, prohibition, or start of a lane change is decided according to whether the travel distance passes a first predetermined distance or a second predetermined distance. The first predetermined distance is set to a distance longer than the second predetermined distance. The second predetermined distance is a distance set in order to make a nearby vehicle know the intention of a lane change of the subject vehicle M, similarly to the third predetermined time Tc. The first predetermined distance is an example of a "predetermined distance" and the second predetermined distance is an example of a "reference distance" in the scope of claims.

For example, in the modification example of the embodiment, after the second predetermined time Tb is replaced with the first predetermined distance and the third predetermined time Tc is replaced with the second predetermined distance, the procedure of the flowchart of the aforementioned embodiment may be performed. In this way, in the modification example of the embodiment, since the lane change support controller 210 decides a start timing of a lane change on the basis of whether the subject vehicle M has traveled the second predetermined distance after the winker is operated, even when the winker is operated and a condition for starting the lane change is satisfied for example, it is possible to keep the execution of the lane change waiting until the subject vehicle M travels the second predetermined distance, so that it is possible to perform the lane change at a time point at which the subject vehicle M has traveled the second predetermined distance. As a consequence, similarly to the embodiment, it is possible to perform the lane change in consideration of a nearby vehicle or an occupant.

Furthermore, in an automatic drive state, even though there is no operation of the winker lever 40a or the lane change start switch 20b by an occupant, when it is necessary to perform a lane change in order to travel along a route planned by the vehicle control system, such as an overtaking event of overtaking another vehicle existing in front of the subject vehicle M and having a speed lower than that of the subject vehicle M and an event of changing a path of a vehicle to a branch road or a confluent road when traveling along a route set in advance, the vehicle control system itself may start lane change possibility determination by using these events as a trigger.

The aforementioned embodiment can be implemented as follows.

The vehicle control system includes a lane change intention detector that detects the intention of a lane change by an occupant of a vehicle, a storage that stores a program, and a processor, wherein the processor is configured to execute the program to recognize a surrounding situation of the vehicle, determine whether the lane change by the vehicle is possible on the basis of the recognized surrounding situation, change a lane of the vehicle to another lane, independently of a steering operation of the occupant of the vehicle, on the basis of a result detected by the lane change intention detector and the determined result, and decide a starting timing of the lane change on the basis of whether a predetermined time has passed or the vehicle has traveled a predetermined distance after the intention of the lane change is detected by the lane change intention detector.

While preferred embodiments of the invention have been described and illustrated above, it should be understood that these are exemplary of the invention and are not to be considered as limiting. Additions, omissions, substitutions, and other modifications can be made without departing from the spirit or scope of the present invention.

What is claimed is:
1. A vehicle control system, comprising:
a lane change intention detector that detects an intention of a lane change by an occupant of a vehicle;
a recognizer that recognizes a surrounding situation of the vehicle; and
a lane change controller that determines whether the lane change by the vehicle is possible based on the surrounding situation recognized by the recognizer, and changes a lane of the vehicle to another lane, independently of a steering operation of the occupant of the vehicle, based on the detection result of the lane change intention detector and the determined result,
wherein the lane change controller decides a starting timing of the lane change based on whether a first predetermined time has passed or the vehicle has traveled a first predetermined distance after the intention of the lane change is detected by the lane change intention detector,
wherein the lane change controller performs the lane change in a case of which a time passed after the intention of the lane change is detected by the lane change intention detector is equal to or less than a second predetermined time longer than the first predetermined time or in a case of which a distance traveled by the vehicle after the intention of the lane change is detected by the lane change intention detector is equal to or less than a second predetermined distance longer than the first predetermined distance,
wherein the lane change controller stops the lane change in a case of which the time is more than the second predetermined time or in a case of which the distance is more than the second predetermined distance.

2. The vehicle control system according to claim 1, wherein, before the first predetermined time passes after the intention of the lane change is detected by the lane change intention detector, in a case of which it is determined that the lane change by the vehicle is possible, the lane change controller starts the lane change after the first predetermined time passes, or
before the vehicle travels the first predetermined distance after the intention of the lane change is detected by the lane change intention detector, in a case of which it is determined that the lane change by the vehicle is possible, the lane change controller starts the lane change after the vehicle travels the first predetermined distance.

3. The vehicle control system according to claim 1, wherein, after the intention of the lane change is detected by the lane change intention detector and the first predetermined time passes, in a case of which it is determined that the lane change by the vehicle is possible, the lane change controller starts the lane change after it is determined that the lane change is possible, or
after the intention of the lane change is detected by the lane change intention detector and the vehicle travels the first predetermined distance, in a case of which it is determined that the lane change by the vehicle is possible, the lane change controller starts the lane change after it is determined that the lane change is possible.

4. The vehicle control system according to claim 1, further comprising:
an information outputter that outputs information; and
an output controller that causes the information outputter to output information,
wherein the output controller causes the information outputter to output standby information indicating that waiting without performing the lane change is performed before the lane change is started by the lane change controller after the intention of the lane change is detected by the lane change intention detector.

5. The vehicle control system according to claim 4, wherein the information outputter includes a display device, and
the output controller causes the display device to display, as the standby information, one or more section lines, which partition a lane indicated by the intention detected by the lane change intention detector, among one or more section lines of a road recognized by the recognizer as the surrounding situation.

6. The vehicle control system according to claim 5, wherein the output controller changes a display mode in a case of which the section lines are displayed in a case where it is determined by the lane change controller that the lane change by the vehicle is possible and in a case where it is determined by the lane change controller that the lane change by the vehicle is not possible.

7. The vehicle control system according to claim 1, wherein, until a reference time longer than the first predetermined time passes after the intention of the lane change is detected by the lane change intention detector, in a case of which it is not determined that the lane change by the vehicle is possible, the lane change controller stops the lane change, or
until the vehicle travels a reference distance longer than the first predetermined distance after the intention of the lane change is detected by the lane change intention detector, in a case of which it is not determined that the lane change by the vehicle is possible, the lane change controller stops the lane change.

8. The vehicle control system according to claim 7, further comprising:
an information outputter that outputs information; and
an output controller that causes the information outputter to output information,
wherein the output controller causes the information outputter to output standby information indicating that waiting without performing the lane change is performed before the lane change is started by the lane change controller after the intention of the lane change is detected by the lane change intention detector, and
in a case of which the lane change is stopped by the lane change controller, the output controller causes the information outputter to stop output of the standby information and causes the information outputter to output stop information indicating that the lane change is stopped.

9. A vehicle control method causing an in-vehicle computer to perform:
detecting an intention of a lane change by an occupant of a vehicle;
recognizing a surrounding situation of the vehicle;
determining whether the lane change by the vehicle is possible based on the recognized surrounding situation;
changing a lane of the vehicle to another lane, independently of a steering operation of the occupant of the vehicle, based on the detection result of the intention of the lane change and the determined result;
deciding a starting timing of the lane change based on whether a first predetermined time has passed or the vehicle has traveled a first predetermined distance after the intention of the lane change is detected;
performing the lane change in a case of which a time passed after the intention of the lane change is detected is equal to or less than a second predetermined time longer than the first predetermined time or in a case in which a distance traveled by the vehicle after the intention of the lane change is detected is equal to or less than a second predetermined distance longer than the first predetermined distance; and
stopping the lane change in a case of which the time is more than the second predetermined time or in a case of which the distance is more than the second predetermined distance.

* * * * *